Figure 1:
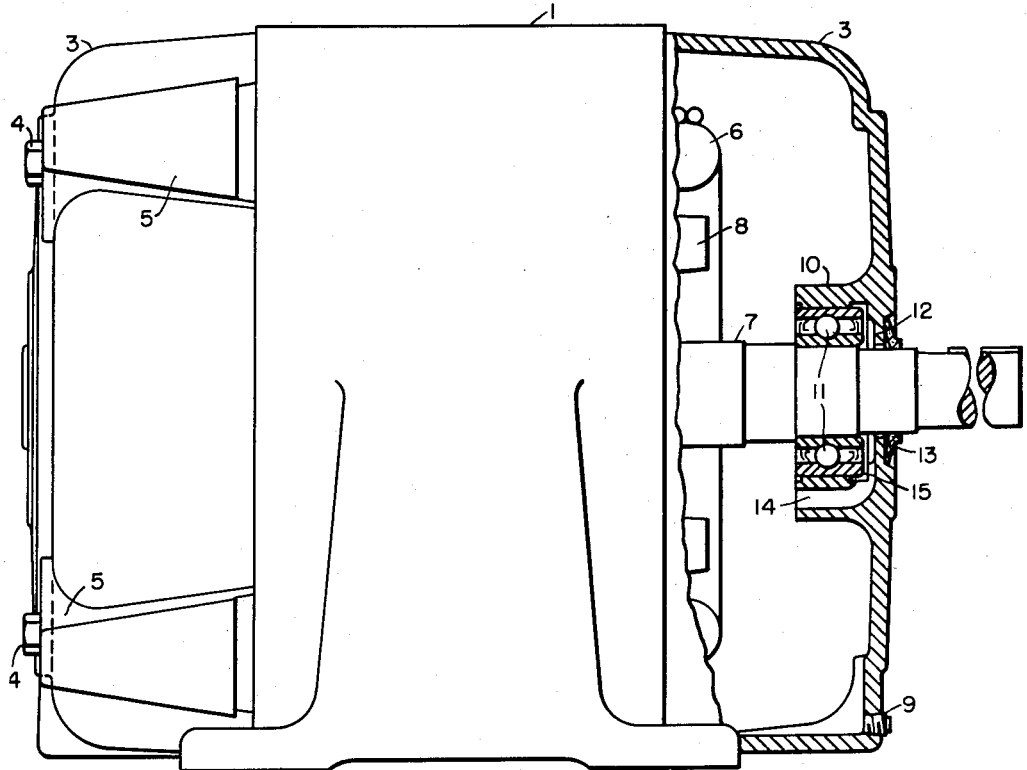

May 29, 1956 J. H. PENNEY ET AL 2,747,947
BEARING CONSTRUCTION
Filed Feb. 26, 1954

WITNESSES
Robert C. Baird
Wm. B. Sellers.

INVENTORS
James H. Penney, Harry C. Werner
and Ephraim H. Anderson.
BY
ATTORNEY

:::

United States Patent Office 2,747,947
Patented May 29, 1956

2,747,947

BEARING CONSTRUCTION

James H. Penney, East Amherst, and Harry C. Werner and Ephraim H. Anderson, Buffalo, N. Y., assignors to Westinghouse Electric Corporation, East Pittsburgh, Pa., a corporation of Pennsylvania Application February 26, 1954, Serial No. 412,874

7 Claims. (Cl. 308—187.1)

The present invention relates to a bearing construction for enclosed machines, such as dynamoelectric machines, and more particularly to means for preventing contamination or deterioration of the bearing lubricant caused by air flow through the bearing.

In an enclosed machine, such as a totally-enclosed dynamoelectric machine, there is an unavoidable flow of air into and out of the machine. This air flow, or breathing, is caused by heating or cooling of the air within the machine, and temperature or pressure changes of the air outside. Since the machine cannot be made absolutely air tight, the changes in relative pressure of the air on the inside and outside of the machine cause air to flow in and out of the machine through various paths at joints and other places where it is not practical to provide airtight seals. Air flow through the machine may also be caused by an internal fan or blower, such as is frequently used to circulate the air within the machine.

One of the paths for such air flow is through the bearings, which obviously cannot be completely sealed against air. Flow of air through the bearings is very undesirable, however, especially in the case of grease-lubricated anti-friction bearings, since the grease may be contaminated by dirt or other solid material or by liquid carried by the air. Such materials may react chemically with the grease, causing deterioration, or may have an abrasive action and other adverse effects. It is possible to provide bearing seals which are more or less effective in excluding solids or liquids carried by the air, but even if such seals are used, harmful gases can flow through the bearing, causing contamination or deterioration of the grease by chemical reaction or otherwise, and even air alone is harmful and may cause deterioration of the grease by drying or oxidizing the oil component of the grease. The effect of the breathing action on the bearing, therefore, is to cause deterioration of the lubricant, thus materially shortening the life of the bearing.

The principal object of the present invention is to provide a bearing construction for enclosed machines in which air flow through the bearing is substantially prevented.

Another object of the invention is to provide a bearing construction for enclosed machines in which an air by-pass is provided which substantially equalizes the air pressure on opposite sides of the bearing to prevent air flow through the bearing.

A further object of the invention is to provide a bearing construction for enclosed machines in which an air by-pass is provided located so that the air pressure on opposite sides of the bearing is substantially equalized, and so that the by-pass itself is protected so that it cannot become clogged with dirt or other foreign material.

Figure 2:
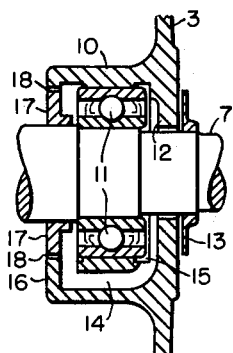
Figure 3:
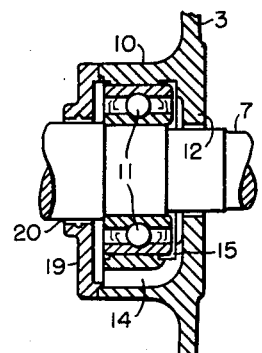

Other objects and advantages of the invention will be apparent from the following detailed description, taken in connection with the accompanying drawing in which:

Figure 1 is a view of an electric motor embodying the invention, partly in side elevation, and partly in longitudinal section; and Figs. 2 and 3 are fragmentary sectional views of bearing housings showing modified embodiments of the invention.

The new bearing construction is applicable to any type of enclosed machine in which breathing may occur, and a preferred embodiment of the invention is shown in the drawing, for the purpose of illustration, in a totally-enclosed, non-ventilated electric motor. The motor may be of any desired construction, and is shown as having a cylindrical frame 1 provided with mounting feet 2. The frame is closed at the ends by end brackets 3, which may be secured to the frame by bolts 4 passing through mounting lugs 5 of any suitable construction. The motor has windings 6 carried on a core supported in the frame 1, and has a rotor member, of any suitable type, mounted on a shaft 7 and preferably including fan blades 8 for circulating the air within the machine.

As indicated above, the machine is totally enclosed, and the end brackets 3 have no openings in them, so that the machine is ventilated entirely by circulation of the internal air, which carries the heat generated in the motor to the surfaces of the frame 1 and brackets 3 from which it is radiated to the surrounding air. The brackets 3 may be of any suitable construction, and may be provided with drain openings at the bottom which are normally closed by plugs 9. Each end bracket 3 has a central bearing housing 10, which is preferably formed integrally with the bracket, and the shaft 7 is supported in ball bearings 11 mounted in the bearing housings 10.

The bearing housing 10 is generally annular, as shown in the drawing, and at its outer side it has a bearing cap portion 12, which may be integral with the housing, and which closely encircles the shaft 7 to substantially close the outer side of the bearing housing. If necessary or desired, an external rotating seal or flinger 13, which may be made of rubber or other resilient material, may be placed on the shaft 7 to effectively close the housing against the entrance of dirt or other solid or liquid material.

As previously explained, an enclosed machine, such as the motor described, is subject to breathing, that is, a flow of air into and out of the machine through any available paths. One such path is through the bearing 11, which cannot be completely sealed against air flow. This is undesirable, since air flowing through the bearing causes contamination or deterioration of the grease with which the bearing is lubricated, thus reducing the life of the bearing.

In order to prevent this flow of air through the bearing, an air by-pass is provided consisting of a passage 14 formed in the lower part of the bearing housing 10. The outer end of this passage terminates at a location, such as indicated at 15, on the outer side of the bearing 11 but within the housing cap portion 12, so that the outer end of the air by-pass is within the bearing housing and is protected from the outside air. The inner end of the by-pass 14 terminates on the inner side of the bearing 11 and as close to the bearing as possible. It has been found that the air pressure within the machine varies greatly at different points in the machine, due to the circulation of the internal air. In order for the by-pass to be effective, it is necessary for the pressure at its inner end to be substantially the same as the pressure at the inner side of the bearing, and to obtain this condition, the inner end of the by-pass must terminate as close to the bearing as possible. The inner end of the by-pass 14 must be located, therefore, as shown in the drawing, in a position where it is as close to the bearing in the radial direction as possible.

When the by-pass is located as described, so that there is substantially no pressure difference between the inner side of the bearing itself and the inner end of the by-pass, the effect of the by-pass is to substantially equalize the air pressure on opposite sides of the bearing, since the pressure will necessarily be the same at opposite ends of the by-pass passage. Thus, the pressure difference across the bearing is made substantially zero, and there is no tendency for air to flow through the bearing, since the by-pass provides a very low resistance path for air flow in parallel with the bearing, and little or no air flows through the bearing. Thus, contamination or deterioration of the grease is substantially prevented.

The location of the outer end of the by-pass 14 within the bearing housing is also an important feature of the invention. By locating it in this position, the by-pass is protected from the outside air, and it is impossible for dirt or other foreign material to get into the by-pass passage and clog it, which would reduce or destroy its effectiveness. Thus, the particular location and arrangement of the by-pass described results in equalizing the air pressure on opposite sides of the bearing to prevent air flow through the bearing, and also protects the by-pass itself from becoming clogged or obstructed by dirt or other foreign material.

A somewhat modified construction is shown in Fig. 2, in which the inner termination of the by-pass is actually within the radial extent of the bearing, so that the pressure is necessarily the same as that at the bearing. In this embodiment, the bearing housing 10 and by-pass passage 14 may be substantially as shown in Fig. 1 and described above. The inner side of the housing 10, however, is provided with an annular cap portion or baffle 16, which may be integral with the bearing housing or which may be a separate baffle member attached to it. A rotating flinger 17 is secured on the shaft adjacent the bearing in the opening of the cap portion 16. The flinger 17 is proportioned to provide a small radial clearance 18 with the cap portion 16 so that the effective termination of the by-pass passage 14 is within the radial extent of the bearing, since the diameter of the flinger 17 can readily be made less than the diameter of the bearing. In this way, the pressure at the inner end of the by-pass 14 is necessarily the same as that at the bearing itself, and the pressure across the bearing is, therefore, equalized to prevent air flow through the bearing, as explained above.

Fig. 3 shows a still further embodiment of the invention. In this construction, the bearing housing 10 and by-pass passage 14 are as shown in Fig. 1 and previously described. An inner bearing cap or baffle 19 is provided, secured in any desired manner to the inner side of the bearing housing. The cap 19 is an annular member which closely encircles the shaft 7 and provides a small clearance 20 around the shaft. It will be seen that the effect of this construction is to carry the inner termination of the by-pass passage 14 substantially to the shaft itself, and thus, the effect is similar to that of Fig. 2, but the by-pass passage in effect extends closer to the shaft and its end is well within the radial extent of the bearing, so that the pressure is necessarily the same as that at the bearing itself and equalization of the pressure on opposite sides of the bearing is insured.

It should now be apparent that a bearing construction has been provided for enclosed machines in which air flow through the bearing is substantially prevented by means of an air by-pass which equalizes the pressure on opposite sides of the bearing and which is itself effectively protected against being clogged by dirt. It will be understood that various modifications may be made within the scope of the invention. Thus, in the enclosed machine shown, it is not necessary to protect the inner end of the by-pass passage from dirt, but if the bearing is to be used in a machine which is not completely enclosed, an inner sealing means similar to that shown on the outside could be used to protect the by-pass passage from dirt.

The invention has been described with particular reference to a dynamoelectric machine, but it will be apparent that the usefulness of the new bearing construction is not restricted to this particular application, and that it may be used equally well in other enclosed machines. It is to be understood, therefore, that the invention is not restricted to the specific embodiment and details of construction shown for the purpose of illustration, but in its broadest aspects it includes all equivalent embodiments and modifications.

We claim as our invention:

1. A bearing construction for an enclosed machine, said construction including a bearing housing, a grease-lubricated anti-friction bearing supported in the housing, means for substantially closing the outer side of the housing, and the housing having an air passage therein by-passing the bearing, said passage being unobstructed for free flow of air therethrough, one end of said passage terminating within the housing on the outer side of the bearing and the other end of the passage terminating immediately adjacent the inner side of the bearing at a location such that the pressure difference across the bearing is substantially zero.

2. A bearing construction for an enclosed machine, said construction including a bearing housing, a grease-lubricated anti-friction bearing supported in the housing, means for substantially closing the outer side of the housing, and the housing having an air passage therein by-passing the bearing, said passage being unobstructed for free flow of air therethrough, one end of said passage terminating within the housing on the outer side of the bearing and the other end of the passage terminating immediately adjacent the inner side of the bearing at a location where the air pressure is substantially the same as the air pressure at the bearing.

3. A bearing construction for an enclosed machine, said construction including a bearing housing, a grease-lubricated anti-friction bearing supported in the housing, said housing including a bearing cap portion substantially closing the outer side of the housing, and the housing having an air passage therein by-passing the bearing, said passage being unobstructed for free flow of air therethrough, the outer end of said passage terminating within the cap portion of the housing and the inner end of the passage terminating immediately adjacent the inner side of the bearing.

4. A bearing construction for an enclosed machine, said construction including a bearing housing, a grease-lubricated anti-friction bearing supported in the housing, said housing including a bearing cap portion substantially closing the outer side of the housing, and the housing having an air passage therein by-passing the bearing, said passage being unobstructed for free flow of air therethrough, the outer end of said passage terminating within the cap portion of the housing and the inner end of the passage terminating immediately adjacent the inner side of the bearing at a location such that the pressure difference across the bearing is substantially zero.

5. A bearing construction for an enclosed machine, said construction including a bearing housing, a grease-lubricated anti-friction bearing supported in the housing, said housing including a bearing cap portion substantially closing the outer side of the housing, and the housing having an air passage therein by-passing the bearing, said passage being unobstructed for free flow of air therethrough, the outer end of said passage terminating within the cap portion of the housing and the inner end of the passage terminating immediately adjacent the inner side of the bearing, and baffle means adjacent the inner side of the bearing enclosing the inner end of the passage and providing an opening within the radial extent of the bearing.

6. A bearing construction for an enclosed machine, said construction including a bearing housing, a grease-lubricated anti-friction bearing supported in the housing, said housing including a bearing cap portion substantially closing the outer side of the housing, and the housing having an air passage therein by-passing the bearing, said passage being unobstructed for free flow of air therethrough, the outer end of said passage terminating within the cap portion of the housing and the inner end of the passage terminating immediately adjacent the inner side of the bearing, and baffle means on the inner side of the housing, said baffle means extending radially past the end of the passage and providing an opening within the radial extent of the bearing.

7. A bearing construction for an enclosed machine, said construction including a bearing housing, a grease-lubricated anti-friction bearing supported in the housing, means for substantially closing the outer side of the housing, and the housing having an air passage therein by-passing the bearing, said passage being unobstructed for free flow of air therethrough, one end of said passage terminating within the housing on the outer side of the bearing and the other end of the passage terminating immediately adjacent the inner side of the bearing.

References Cited in the file of this patent
UNITED STATES PATENTS

| | | |
|---|---|---|
| 2,105,976 | Langlois | Jan. 18, 1938 |
| 2,179,321 | Brown | Nov. 7, 1939 |
| 2,239,283 | Brown | Apr. 22, 1941 |
| 2,266,107 | Waterfill | Dec. 16, 1941 |

FOREIGN PATENTS

| | | |
|---|---|---|
| 540,412 | Great Britain | Oct. 16, 1941 |